United States Patent
Kolavennu et al.

(10) Patent No.: US 7,237,381 B2
(45) Date of Patent: Jul. 3, 2007

(54) CONTROL OF EXHAUST TEMPERATURE FOR AFTER-TREATMENT PROCESS IN AN E-TURBO SYSTEM

(75) Inventors: Soumitri N. Kolavennu, Minneapolis, MN (US); Syed M Shahed, Ranch Palos Verdes, CA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 11/113,538

(22) Filed: Apr. 25, 2005

(65) Prior Publication Data

US 2006/0236692 A1    Oct. 26, 2006

(51) Int. Cl.
| F02B 33/44 | (2006.01) |
| F02D 23/00 | (2006.01) |
| F01N 5/04 | (2006.01) |
| F02M 25/07 | (2006.01) |

(52) U.S. Cl. .................. 60/608; 60/602; 60/605.2; 60/280

(58) Field of Classification Search .......... 60/607–609, 60/602, 605.2, 280, 597, 599; 123/568.12
See application file for complete search history.

(56) References Cited

U.S. PATENT DOCUMENTS

| 4,694,653 | A | * | 9/1987 | Kawamura | .................... 60/597 |
| 6,497,227 | B2 | * | 12/2002 | Wang et al. | ................ 60/605.2 |
| 6,568,173 | B1 | | 5/2003 | Kolmanovsky et al. | ........ 60/280 |
| 6,609,372 | B2 | * | 8/2003 | Maddock et al. | ............. 60/602 |
| 6,637,205 | B1 | * | 10/2003 | Ahmad et al. | ................ 60/608 |
| 6,647,724 | B1 | * | 11/2003 | Arnold et al. | ................ 60/608 |
| 6,705,084 | B2 | * | 3/2004 | Allen et al. | .................... 60/608 |
| 6,848,434 | B2 | * | 2/2005 | Li et al. | ................ 123/568.12 |
| 6,907,867 | B2 | * | 6/2005 | Igarashi et al. | ................ 60/608 |

(Continued)

FOREIGN PATENT DOCUMENTS

DE    103 49 164    5/2004

(Continued)

OTHER PUBLICATIONS

The International Search Report and written Opinion for PCT Application No. PCT/US2006/009024; Filed Mar. 13, 2006; Date of Completion Aug. 17, 2006; Date of Mailing Aug. 24, 2006.

*Primary Examiner*—Thai-Ba Trieu
(74) *Attorney, Agent, or Firm*—Chris James

(57) ABSTRACT

A method for operating a turbocharged internal combustion engine having an after-treatment device for treating exhaust gas discharged from the turbocharger, wherein exhaust gas from the engine is passed through a variable-geometry mechanism for regulating power produced by the turbine. The method comprises the steps of measuring a boost pressure of the air delivered to the intake of the engine, measuring a temperature of the exhaust gas delivered to the after-treatment device, causing the temperature of the exhaust gas delivered to the after-treatment device to substantially match a predetermined target temperature by controlling the variable-geometry mechanism of the turbine to control the amount of power extracted by the turbine, and causing the boost pressure to substantially match a predetermined target boost pressure by either inputting mechanical power into or extracting mechanical power from the turbocharger, as required, using a power addition/extraction device, such as a motor/generator, coupled to the turbocharger.

12 Claims, 2 Drawing Sheets

U.S. PATENT DOCUMENTS

Figure 1:
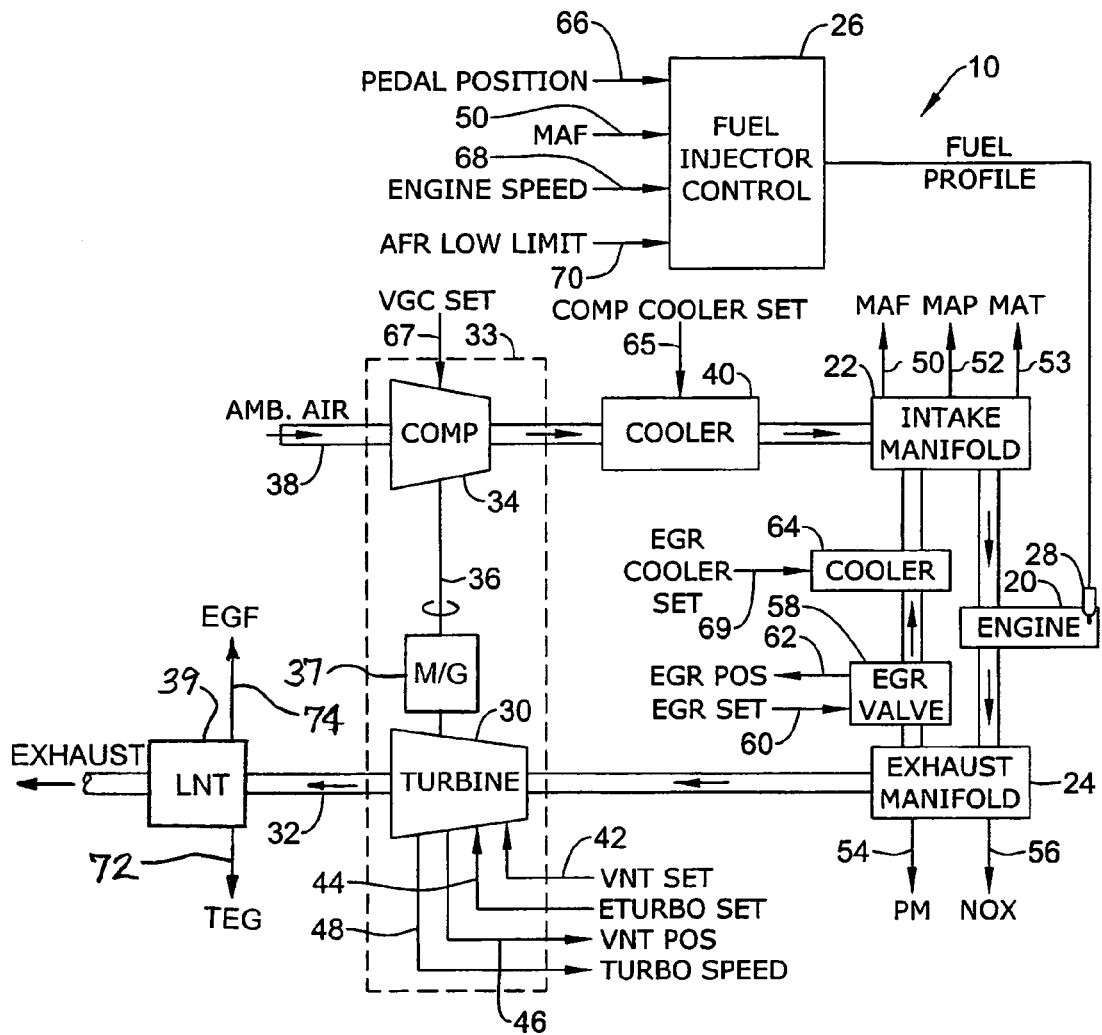

| | | | |
|---|---|---|---|
| 6,931,850 B2* | 8/2005 | Frank et al. | 60/608 |
| 2004/0061290 A1* | 4/2004 | Gray | 277/411 |
| 2005/0000217 A1 | 1/2005 | Nau et al. | 60/280 |
| 2006/0032225 A1* | 2/2006 | Dyne et al. | 60/607 |
| 2006/0137340 A1* | 6/2006 | Stewart | 60/599 |

FOREIGN PATENT DOCUMENTS

| | | |
|---|---|---|
| EP | 1 260 684 | 11/2002 |
| JP | 61 040417 | 2/1986 |

* cited by examiner

CONTROL OF EXHAUST TEMPERATURE FOR AFTER-TREATMENT PROCESS IN AN E-TURBO SYSTEM

BACKGROUND OF THE INVENTION

The present invention relates in general to turbocharged internal combustion engine systems, and more particularly relates to systems in which the exhaust gas from the engine is subjected to an after-treatment process for reducing emissions.

Internal combustion engines are often turbocharged for increasing their power and torque output. One commonly employed type of turbocharger for this purpose is a variable-nozzle exhaust gas turbocharger having a turbine that extracts power from the exhaust gas discharged by the internal combustion engine and drives a compressor that compresses air and delivers the air to the engine intake. The turbine includes a variable-geometry mechanism that can be opened or closed by varying degrees for regulating the flow of exhaust gas into the turbine, thereby regulating how much power the turbine extracts. In this manner, the boost pressure of the air supplied to the intake can be regulated in a desired fashion depending on the engine operating conditions.

There is frequently a need or desire to reduce emissions from internal combustion engines, such as for meeting government-regulated emissions standards. Of special interest is reduction in oxides of nitrogen (NOx) and particulate matter. Various approaches are used to reduce such emissions, including the use of exhaust gas recirculation (EGR) in which a portion of the exhaust gas from the engine is recirculated back to the intake. Another technique for reducing emissions is after-treatment of the exhaust gas using various types of after-treatment devices designed to remove certain substances or convert them into less-offensive forms prior to release of the exhaust gas into the environment.

In some after-treatment devices, the performance of the device can depend on the temperature of the exhaust gas entering the device. In conventional turbocharged engine systems employing a variable-geometry mechanism for the turbine, the temperature of the exhaust gas entering the after-treatment device cannot generally be controlled because the variable-geometry mechanism position is set to achieve a certain boost pressure, and there is no other provision for independently controlling the exhaust gas temperature.

BRIEF SUMMARY OF THE INVENTION

The present invention in a first aspect addresses the above needs and achieves other advantages, by providing a method for operating a turbocharged internal combustion engine having an after-treatment device for treating exhaust gas from the engine, wherein exhaust gas from the engine is passed through a variable-nozzle turbine (or other variable-geometry mechanism for regulating exhaust gas flow into the turbine) of a turbocharger and the turbine drives a compressor of the turbocharger for compressing air delivered to an intake of the engine, and the exhaust gas discharged from the turbine is delivered to the after-treatment device. The method comprises the steps of measuring a boost pressure of the air delivered to the intake of the engine, measuring a temperature of the exhaust gas delivered to the after-treatment device, causing the temperature of the exhaust gas delivered to the after-treatment device to substantially match a predetermined target temperature by controlling the variable-geometry mechanism of the turbine to control the amount of power extracted by the turbine, and causing the boost pressure to substantially match a predetermined target boost pressure by either inputting mechanical power into or extracting mechanical power from the turbocharger, as required, using a power addition/extraction device coupled to the turbocharger.

The power addition/extraction device coupled to the turbocharger for adding or extracting power advantageously comprises an electrical motor/generator coupled to the shaft of the turbocharger. When the variable-geometry mechanism position required for ensuring the exhaust gas temperature matches the target temperature is such that more power is extracted by the turbine than that required for reaching the target boost pressure, then the electrical motor/generator is operated in a generator mode to extract the excess power from the turbocharger. On the other hand, when the variable-geometry mechanism position is such that the turbine does not provide enough power to reach the target boost pressure, the electrical motor/generator is operated in a motor mode to input the needed additional power to the turbocharger in order to meet the target boost pressure.

The method in one embodiment comprises the additional step of recirculating a portion of the exhaust gas back to the intake of the engine (i.e., exhaust gas recirculation, or EGR) at an EGR flow rate. The temperature of the exhaust gas is caused to substantially match the predetermined target temperature by regulating the EGR flow rate in conjunction with controlling the variable-geometry mechanism of the turbine.

In one embodiment of the invention, a programmed air-side controller receives the target boost pressure, the actual boost pressure, the target temperature, and the actual temperature of the exhaust gas as inputs, and the controller outputs a control signal to the motor/generator and a control signal to the variable-geometry mechanism of the turbine. When exhaust gas recirculation is employed, the controller also outputs a control signal for controlling the EGR flow rate.

The invention in another aspect provides a turbocharger system for an engine having an after-treatment device for treating exhaust gas from the engine. The turbocharger system includes a turbocharger comprising a compressor for compressing air and supplying the compressed air at a boost pressure to an intake of the engine, and a turbine that receives exhaust gas from the engine and extracts power therefrom, the turbine being coupled to the compressor for driving the compressor, the turbine including a variable-geometry mechanism operable to regulate the power extracted by the turbine. The system also includes a power addition/extraction device coupled to the turbocharger and operable to either input mechanical power into or extract mechanical power from the turbocharger. A air-side controller receives a target boost pressure, an actual boost pressure, a target temperature, and an actual temperature of the exhaust gas as inputs. The controller outputs a control signal to the power addition/extraction device and a control signal to the variable-geometry mechanism so as to cause the temperature of the exhaust gas delivered to the after-treatment device to substantially match the target temperature by controlling the variable-geometry mechanism of the turbine to control the amount of power extracted by the turbine, and to cause the boost pressure to substantially match the target boost pressure by either inputting mechanical power into or extracting mechanical power from the turbocharger, as required, using the power addition/extraction device. The power addition/extraction device advantageously can be an electrical motor/generator.

BRIEF DESCRIPTION OF THE SEVERAL VIEWS OF THE DRAWING(S)

Figure 2:
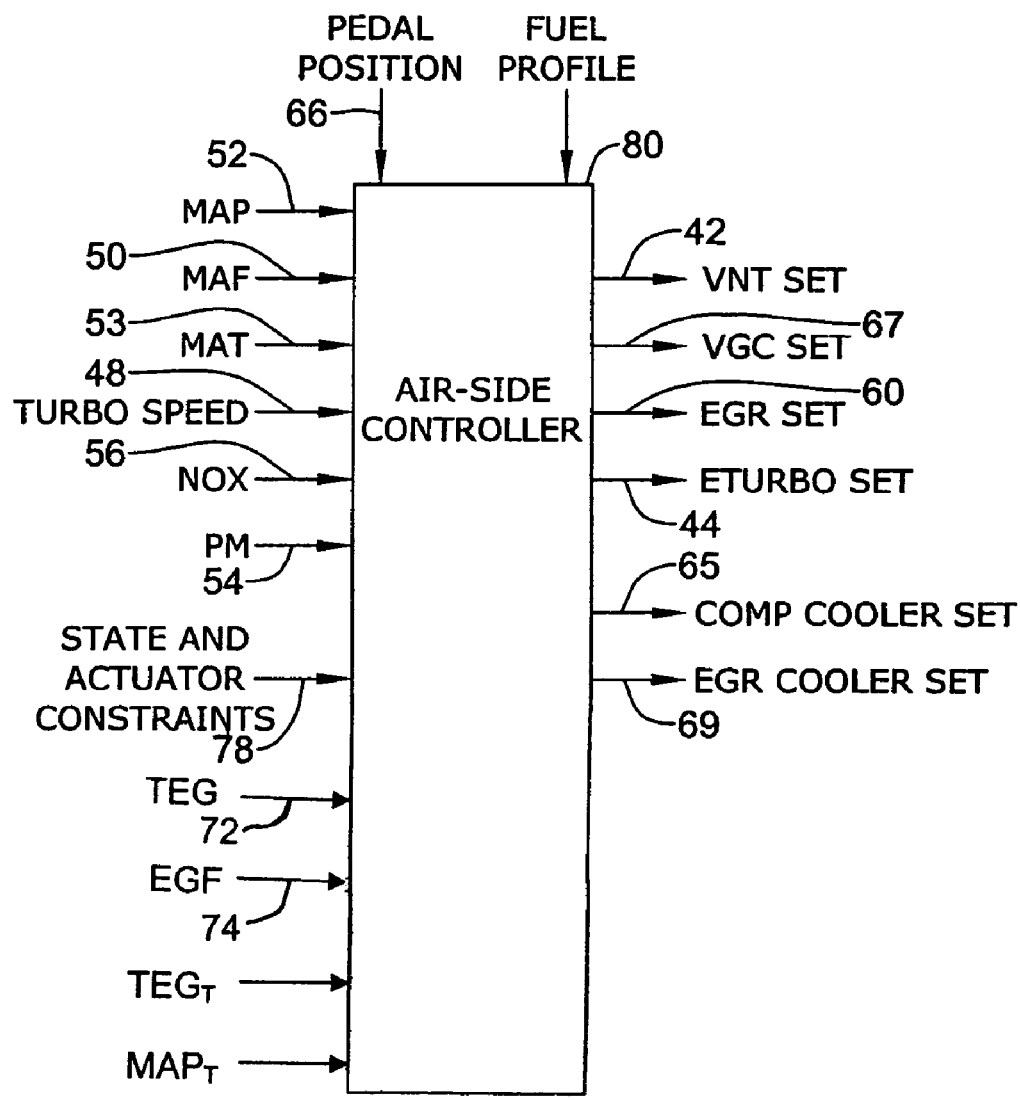

Having thus described the invention in general terms, reference will now be made to the accompanying drawings, which are not necessarily drawn to scale, and wherein:

FIG. 1 is a schematic view of an illustrative internal combustion engine system in accordance with one embodiment of the present invention; and FIG. 2 is a schematic view of an illustrative air-side controller for use with the illustrative internal combustion engine system of FIG. 1.

DETAILED DESCRIPTION OF THE INVENTION

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 is a schematic view of an illustrative internal combustion engine system in accordance with the present invention. The illustrative internal combustion engine system is generally shown at 10, and includes a internal combustion engine 20 that has an intake manifold 22 and an exhaust manifold 24. The internal combustion engine 20 can be a diesel engine, a gasoline engine (e.g., a lean-burn, direct-injection gasoline engine), or the like. In the illustrative embodiment, a fuel injector 28 provides fuel to the engine 20. The fuel injector 28 may be a single fuel injector, but more commonly may include a number of fuel injectors that are independently controllable. A fuel injector controller 26 is provided to control the fuel injector(s) 28 such that the fuel injector(s) 28 provide a desired fuel profile to the engine 20. The term fuel "profile", as used herein, may include any number of fuel parameters or characteristics including, for example, fuel delivery rate, change in fuel delivery rate, fuel timing, fuel pre-injection event(s), fuel post-injection event(s), fuel pulses, and/or any other fuel delivery characteristic, as desired. One or more fuel side actuators may be used to control these and other fuel parameters, as desired.

The fuel injector controller 26 may receive and use any number of input signals to produce the desired fuel profile. For example, the illustrative fuel injector controller 26 can receive a pedal position signal 66, an intake Manifold Air Flow (MAF) signal 50, an Engine Speed signal 68, and an Air-Fuel-Ratio (AFR) Low Limit signal 70. These signals are only illustrative. For example, and in some cases, the fuel injector controller 26 may receive one or more control signals from an air-side controller (see FIG. 2), but this is not required.

In the illustrative embodiment, exhaust from the engine 20 is provided to the exhaust manifold 24, which delivers the exhaust gas down an exhaust pipe 32. In the illustrative embodiment, a turbocharger 33 is provided downstream of the exhaust manifold 24. The illustrative turbocharger 33 includes a turbine 30, which is driven by the exhaust gas flow. In the illustrative embodiment, the rotating turbine 30 drives a compressor 34 through a mechanical coupling 36. The compressor receives ambient air through passageway 38, compresses the ambient air, and provides compressed air to the intake manifold 22, as shown.

The turbocharger 33 comprises a variable nozzle turbine (VNT) turbocharger. However, it is contemplated that any suitable turbocharger having variable geometry features for controlling the exhaust gas flow into the turbine may be used including, for example, a waste gated turbocharger, or a variable geometry inlet nozzle turbocharger (VGT) with an actuator to operate the waste gate or VGT vane set. The illustrative VNT turbocharger uses adjustable vanes inside an exhaust scroll to change the angle of attack of the incoming exhaust gases as they strike the exhaust turbine 30. In the illustrative embodiment, the angle of the vanes, and thus the amount of boost (MAP) pressure provided by the compressor 34, may be controlled by a VNT SET signal 42. In some cases, a VNT position signal 46 is provided to indicate the current vane position. A turbo speed signal 48 may also be provided to indicate the current turbine speed. In some cases, it may be desirable to limit the turbo speed to help prevent damage to the turbine 30.

The turbocharger 33 also includes a power addition/extraction device 37 that is mechanically coupled to the turbine 30. The power addition/extraction device is a device operable for either adding power to the turbocharger (i.e., increasing the amount of mechanical power driving the compressor 34) or extracting power from the turbocharger (i.e., decreasing the amount of mechanical power driving the compressor 34). The power/extraction device is controllable to select whether it adds power to or extracts power from the turbocharger, and to regulate the amount of the added or extracted power, for purposes explained further below. A suitable type of power addition/extraction device 37 is an electrical motor/generator (M/G) operable to be operated in either a motor mode in which electrical power supplied to the motor/generator is converted into mechanical power for adding power to the turbocharger, or a generator mode in which mechanical power from the turbine 30 that would otherwise drive the compressor 34 is converted by the motor/generator into electrical power. The electrical power generated by the motor/generator in the generator mode can be supplied to any of various electrical devices (e.g., for charging a battery used for starting the engine). In the illustrative embodiment, an ETURBO signal may be provided to control the amount of power addition or extraction by the motor/generator 37.

It is contemplated that the compressor 34 may be a variable or non-variable compressor. For example, in some cases, the compressed air that is provided by the compressor 34 may be only a function of the speed at which the turbine 30 rotates the compressor 34. In other cases, the compressor 34 may be a variable geometry compressor (VGC), where in some cases, a VGC SET signal 67 is used to set the vane position at the outlet of the compressor to provide a controlled amount of compressed air to the intake manifold 22.

A compressed air cooler 40 may be provided to help cool the compressed air before the compressed air is provided to the intake manifold 22, as desired. In some embodiments, one or more compressed air cooler control signals 65 may be provided to the compressed air cooler 40 to help control the temperature of the compressed air that is ultimately provided to the intake manifold 22. In some cases, the one or more compressed air cooler control signals 65 may be provided by an air-side controller (see FIG. 2), if desired.

In some cases, and to reduce the emissions of some internal combustion engines, an exhaust gas recirculation (EGR) valve 58 may be inserted between the exhaust manifold 24 and the intake manifold 22, as shown. In the illustrative embodiment, the EGR valve 58 accepts an EGR SET signal 60, which is used to set the desired amount of exhaust gas recirculation (EGR). An EGR POSITION output signal 62 may also be provided, if desired, which may indicate the current position of the EGR valve 58.

In some cases, an EGR cooler 64 may be provided either upstream or downstream of the EGR valve 58 to help cool the exhaust gas before it is provided to the intake manifold 22. In some embodiments, one or more EGR cooler control signals 69 may be provided to the EGR cooler 64 to help control the temperature of the recirculated exhaust gas. In some cases, the one or more EGR cooler control signals 69 may be provided by an air-side controller 80 (see FIG. 2), if desired.

A number of sensors may be provided for monitoring the operation of the engine 20. For example, an intake manifold air flow (MAF) sensor may provide a signal 50 indicative of the intake manifold air flow (MAF). An intake manifold air pressure (MAP) sensor may provide a signal 52 indicative of the intake manifold air pressure (MAP). A manifold air temperature (MAT) sensor may provide a signal 53 indicative of the intake manifold air temperature (MAT). A NOx sensor may provide a signal 56 indicative of the NOx concentration in the exhaust gas. Similarly, a particulate matter (PM) sensor may provide a signal 54 indicative of the particulate matter concentration in the exhaust gas. While the NOx sensor and the PM sensor can be located at the exhaust manifold 24, it is contemplated that these sensors may be provided anywhere downstream of the engine 20, as desired. In addition, the sensors described herein are only illustrative, and it is contemplated that more or fewer sensors may be provided, as desired.

The engine system 10 also includes an after-treatment device 39 downstream of the turbine for receiving the exhaust gases that have been expanded in the turbine and that will be exhausted to atmosphere. In order to reduce emissions from the engine system, it is frequently necessary or desirable to include the after-treatment device 39, which is operable to reduce emissions such as NOx, particulate matter (PM), and/or others. For example, a lean NOx trap (LNT) is often employed for reducing NOx emissions. An LNT generally requires the exhaust gases to have a relatively high temperature in order for the LNT to work properly. Alternatively, the device 39 can comprise a selective catalytic reduction (SCR) unit that employs a reagent for reducing NOx levels in the exhaust gas stream. SCR systems use catalysts to promote a reaction between exhaust gas NOx and a reagent, typically ammonia, that is injected into the exhaust gas stream. SCR catalysts selectively convert NOx into nitrogen and water, thereby reducing NOx emissions by up to 99%. The SCR system can employ porous ceramic, honeycomb substrates that have been coated with a catalyst such as vanadium-titanium or zeolite.

In any event, the temperature of the exhaust gases fed to the after-treatment device 39 is an important parameter affecting the performance of the after-treatment device. In a conventional VNT turbocharger, the exhaust gas temperature cannot be independently controlled because the vane position in the VNT (or, more generally, the position of the variable-geometry mechanism of the variable-geometry turbine) is set to achieve a desired boost pressure of the air fed to the engine intake manifold 22. The amount of boost pressure required dictates the amount of power required from the turbine 30, which in turn dictates the exhaust gas temperature. Thus, in conventional internal combustion engine systems employing an after-treatment device such as an LNT, the after-treatment device may not work properly under all possible operating conditions.

The present invention addresses this problem by enabling independent control of the exhaust gas temperature through the use of the power addition/extraction device (or motor/generator, M/G) 37. In accordance with the invention, a method for operating the turbocharged engine system 10 comprises the steps of measuring the actual boost pressure MAP of the air delivered to the intake manifold 22 of the engine, measuring an actual temperature of the exhaust gas TEG delivered to the after-treatment device 39, causing the temperature of the exhaust gas TEG delivered to the after-treatment device to substantially match a predetermined target temperature $TEG_T$ by controlling the variable-geometry mechanism of the turbine 30 to control the amount of power extracted by the turbine 30, and causing the boost pressure MAP to substantially match a predetermined target boost pressure $MAP_T$ by either inputting mechanical power into or extracting mechanical power from the turbocharger, as required, using the power addition/extraction device 37 coupled to the turbocharger.

As previously noted, the variable-geometry mechanism of the turbine is controlled by a VNT SET signal 42 and the power addition/extraction device 37 is controlled by an ETURBO SET signal 44. The actual exhaust gas temperature TEG of the exhaust gases entering the after-treatment device 39 is measured by a sensor that provides a signal 72 indicative of the TEG. Additionally, the exhaust gas flow rate EGF of the exhaust gases entering the after-treatment device 39 is measured by a flow sensor, which provides a signal 74 indicative of the EGF.

FIG. 2 is a schematic view of an illustrative air-side controller 80 for use with the illustrative engine system of FIG. 1. The illustrative air-side controller 80 receives a number of engine parameters to help provide air-side control to the engine 20. For example, and in one illustrative embodiment, the air-side controller 80 receives input signals such as the MAP sensor output 52, the MAF sensor output 50, the MAT sensor output 53, the turbo speed signal 48, the NOx sensor output 56 and/or the PM sensor output 54, the TEG sensor output 72, and the EGF sensor output 74, all shown in FIG. 1. The controller also receives (or determines based on predetermined algorithms or control logic) the target exhaust gas temperature $TEG_T$ and the target boost pressure $MAP_T$, as shown. These input parameters are only illustrative, and it is contemplated that more or less input parameters may be received, depending on the application. For example, and in some illustrative embodiments, the air-side controller 80 may receive a pedal position (or torque command) signal 66 and/or a fuel profile signal as shown, but this is not required or even desired in some embodiments.

Based on the values of the received input parameters, the illustrative air-side controller 80 provides a number of control outputs to help provide air-side control to the engine 20. For example, the air-side controller 80 provides the VNT SET signal 42 for controlling the turbine variable-geometry mechanism, the EGR SET signal 60 for controlling the EGR valve 58 and in some cases, the COMP. COOLER SET signal 65 and the EGR COOLER Set signal 69. The controller determines what position of the turbine variable-geometry mechanism is needed in order to cause the actual exhaust gas temperature TEG (as indicated by the TEG sensor ouput signal 72) to substantially match the target exhaust gas temperature $TEG_T$. The controller 80 also provides the ETURBO signal 44 for controlling the power addition or extraction by the power addition/extraction device 37. The controller determines how much power must be added into the turbocharger 33 or extracted from the turbocharger in order for the actual manifold intake pressure MAP (as indicated by MAP sensor signal 52) to substantially match the target boost pressure $MAP_T$. Thus, the invention allows both TEG and MAP to be controlled independently, by virtue of the control of the power addition/extraction device 37.

Another parameter that the controller 80 can regulate in order to achieve the desired target exhaust gas temperature and boost pressure values, in addition to the power addition/extraction of device 37 and the position of the turbine variable-geometry mechanism, is the EGR flow rate. The EGR flow rate can be measured by a sensor that outputs a signal indicative of the flow rate. The controller output signal EGR SET 60 regulates the EGR valve 58 in order to control the EGR flow rate. By regulating the EGR flow rate, the controller can achieve an additional degree of control over the boost pressure MAP and the exhaust gas temperature TEG entering the after-treatment device 39.

In some cases, the air-side controller may be a multivariable Model Predictive Controller (MPC). The MPC may include a model of the dynamic process of engine operation, and provide predictive control signals to the engine subject to constraints in control variables and measured output variables. The models may be static and/or dynamic, depending on the application. In some cases, the models produce one or more output signals y(t) from one or more input signals u(t). A dynamic model typically contains a static model plus information about the time response of the system. Thus, a dynamic model is often of higher fidelity than a static model. The MPC can operate substantially as described in co-pending U.S. patent application Ser. No. 11/024,531 filed Dec. 29, 2004, entitled "Multivariable Control for an Engine", the entire disclosure of which is incorporated herein by reference.

It will be appreciated that the air-side controller 80 can comprise a stand-alone control unit separate from an engine control unit (ECU) for the engine 20; the ECU may incorporate the fuel injector control 26 in FIG. 1. Alternatively, the air-side controller 80 can be incorporated into the ECU.

In operation, if the air-side controller 80 determines based on the exhaust gas temperature signal (TEG) 72 that the actual exhaust gas temperature entering the after-treatment device 39 is below the target exhaust gas temperature $TEG_T$, the controller sends a VNT SET signal 42 to the turbine variable-geometry mechanism to close the vanes or sliding piston, thereby reducing the cross-section of the passage through which the exhaust gas enters the turbine. This increases the pressure of the exhaust gas upstream of the turbine, which in turn increases the exhaust gas temperature as desired. However, the increase in exhaust gas pressure upstream of the turbine also increases the pressure differential across the turbine (which is related to the power output of the turbine), which causes the turbine, and therefore the compressor, to rotate faster and thereby increase the pressure of the air (MAP) supplied to the intake manifold of the engine. The controller thus also compares this actual MAP to the target pressure $MAP_T$; if the actual MAP is higher than the target, the controller sends an ETURBO SET signal 44 to the motor/generator 37 to set it to the "generate" mode so that the motor/generator extracts energy from the turbocharger and in so doing effectively acts as a brake to slow down the compressor and thereby reduce the MAP as desired. Conversely, if the controller determines that the actual MAP is lower than the target, the controller sends an ETURBO SET signal to the motor/generator to set it to the "motor" mode so that the motor/generator adds energy to the turbocharger to further speed up the compressor and thereby further increase the MAP as desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific and/or preferred embodiments disclosed and that modifications and other embodiments are intended to be included within the scope of the appended claims. Although specific terms are employed herein, they are used in a generic and descriptive sense only and not for purposes of limitation.

What is claimed is:

1. A method for operating an internal combustion engine having a turbocharger and having an after-treatment device for treating exhaust gas from the engine, wherein exhaust gas from the engine is passed through a variable-geometry mechanism of a turbine of the turbocharger and the turbine drives a compressor of the turbocharger for compressing air delivered to an intake of the engine, and the exhaust gas discharged from the turbine is delivered to the after-treatment device, the method comprising the steps of:

determining an actual boost pressure of the air delivered to the intake of the engine;

determining an actual temperature of the exhaust gas delivered to the after-treatment device;

causing the temperature of the exhaust gas delivered to the after-treatment device to substantially match a predetermined target temperature by controlling the variable-geometry mechanism of the turbine to control the amount of power extracted by the turbine; and causing the boost pressure to substantially match a predetermined target boost pressure by either inputting mechanical power into or extracting mechanical power from the turbocharger, as required, using a power addition/extraction device coupled to the turbocharger.

2. The method of claim 1, further comprising the step of performing exhaust gas recirculation (EGR) by recirculating a portion of the exhaust gas back to the intake of the engine at an EGR flow rate, and wherein the step of causing the temperature of the exhaust gas to substantially match the predetermined target temperature includes regulating the EGR flow rate in conjunction with controlling the variable-geometry mechanism of the turbine.

3. The method of claim 1, wherein the power addition/extraction device comprises an electrical motor/generator that is controlled to operate either in a motor mode when power addition is needed or in a generator mode when power extraction is needed.

4. The method of claim 1, wherein a programmed air-side controller receives the target boost pressure, the actual boost pressure, the target temperature, and the actual temperature of the exhaust gas as inputs, and outputs a control signal to the power addition/extraction device and a control signal to the variable-geometry mechanism.

5. The method of claim 4, further comprising the step of performing exhaust gas recirculation (EGR) by recirculating a portion of the exhaust gas back to the intake of the engine at an EGR flow rate, and wherein the EGR flow rate is controlled in conjunction with controlling the variable-geometry mechanism of the turbine in order to cause the actual temperature of the exhaust gas to substantially match the target temperature.

6. A turbocharger system for an engine having an after-treatment device for treating exhaust gas from the engine, the turbocharger system comprising:

a turbocharger comprising a compressor for compressing air and supplying the compressed air at a boost pressure to an intake of the engine, and a turbine coupled to the compressor for driving the compressor, the turbine receiving exhaust gas from the engine and producing power therefrom to drive the compressor, the turbine including a variable-geometry mechanism operable to regulate the power produced by the turbine;

a power addition/extraction device coupled to the turbocharger and operable to either input mechanical power into or extract mechanical power from the turbocharger; and an air-side controller that receives a target boost pressure, an actual boost pressure, a target temperature of the exhaust gas, and an actual temperature of the exhaust gas as inputs, and outputs a control signal to the power addition/extraction device and a control signal to the variable-geometry mechanism so as to cause the temperature of the exhaust gas delivered to the aftertreatment device to substantially match the target temperature by controlling the variable-geometry mechanism of the turbine to control the amount of power extracted by the turbine, and to cause the boost pressure to substantially match the target boost pressure by either inputting mechanical power into or extracting mechanical power from the turbocharger, as required, using the power addition/extraction device.

7. The turbocharger system of claim 6, wherein the power addition/extraction device comprises an electrical motor/generator.

8. The turbocharger system of claim 6, further comprising an EGR system for recirculating a portion of the exhaust gas back to the intake of the engine at an EGR flow rate, and wherein the air-side controller is structured and arranged to control the EGR system to regulate the EGR flow rate in conjunction with controlling the variable-geometry mechanism of the turbine in order to cause the actual temperature of the exhaust gas to substantially match the target temperature.

9. The turbocharger system of claim 8, further comprising an EGR cooler for cooling the portion of the exhaust gas recirculated back to the intake of the engine.

10. The turbocharger system of claim 9, wherein the air-side controller is structured and arranged to control the EGR cooler for regulating the temperature of the exhaust gas recirculated back to the intake of the engine.

11. The turbocharger system of claim 6, further comprising a compressor cooler arranged to receive air discharged from the compressor and to cool the air before delivery to the intake of the engine.

12. The turbocharger system of claim 11, wherein the air-side controller is structured and arranged to control the compressor cooler for regulating the temperature of the air delivered to the intake of the engine.

* * * * *